United States Patent
Bui et al.

(10) Patent No.: US 6,710,954 B2
(45) Date of Patent: Mar. 23, 2004

(54) TAPE DRIVE AND SERVO SYSTEM STABILIZATION METHOD

(75) Inventors: Nhan Xuan Bui, Tucson, AZ (US); Tomoaki Kimura, Fujisawa (JP); Akimitsu Sasaki, Yokohama (JP)

(73) Assignee: International Business Machines Corporation, Armonk, NY (US)

( * ) Notice: Subject to any disclaimer, the term of this patent is extended or adjusted under 35 U.S.C. 154(b) by 315 days.

(21) Appl. No.: 09/931,227

(22) Filed: Aug. 16, 2001

(65) Prior Publication Data

US 2002/0021514 A1 Feb. 21, 2002

(30) Foreign Application Priority Data

Aug. 16, 2000 (JP) ........................................ 2000-246706

(51) Int. Cl.[7] .............................................. G11B 27/36
(52) U.S. Cl. .......................... 360/31; 360/65; 360/77.12
(58) Field of Search .............................. 360/25, 31, 65, 360/69, 75, 51, 73.04, 77.01, 77.12, 78.02, 78.09, 76

(56) References Cited

U.S. PATENT DOCUMENTS

| | | | | |
|---|---|---|---|---|
| 5,872,672 A | * | 2/1999 | Chliwnyj | 360/77.12 |
| 5,930,065 A | * | 7/1999 | Albrecht | 360/72.2 |
| 6,122,124 A | * | 9/2000 | Fasen | 360/51 |
| 6,239,939 B1 | * | 5/2001 | Bui | 360/51 |

OTHER PUBLICATIONS

Nonlinear Digital Filter–Median Filter and Load Median Filter, by Ryo Taguchi, System Control Information Institute, System/Control/Information, vol. 40, No. 9, pp. 410–418, Dec., 1996.*

* cited by examiner

*Primary Examiner*—Alan T. Faber
(74) *Attorney, Agent, or Firm*—Abdy Raissinia; Bracewell & Patterson, L.L.P.

(57) ABSTRACT

In a tape drive system performing read/write operations on a tape by inserting a tape cartridge into a tape drive, the tape cartridge having a tape on which servo and data tracks are arranged longitudinally and a predetermined servo pattern is recorded on each of the servo tracks, a method and system for re-setting coefficients of a low-pass filter for servo control of the tape drive, each time the tape cartridge is inserted into the tape drive so that a servo system of the tape drive is stabilized. More specifically, the servo pattern is read from the tape in the cartridge inserted into the tape drive, frequency analysis for the read servo pattern is performed, a singularity that exceeds a predetermined spectrum range is detected from frequency components obtained by the frequency analysis, and the coefficients of the low-pass filter are set so as to cancel a power spectrum of the singularity.

12 Claims, 6 Drawing Sheets

TAPE DRIVE AND SERVO SYSTEM STABILIZATION METHOD

BACKGROUND OF THE INVENTION

1. Technical Field

The present invention relates in general to servo controls for a tape drive, and in particular to a technique for stabilizing a servo system for a cartridge tape drive that employs a tape on which servo and data tracks are arranged longitudinally.

2. Description of the Related Art

Around half a century has passed since the first open reel tape drives appeared, and today, tape drives continue to be widely used as mass backup storage for computers. Currently, small tape cartridge drives play a leading role and widely used for a variety of computers from low to high end. Generally, multiple data tracks are longitudinally arranged on a backup tape (normally, a magnetic tape) to record a large amount of data, and a tape head is precisely positioned on a target data track by servo control.

The timing based servo (TBS) system is a well known servo control system for a tape drive. According to this system, at least one specially patterned servo track is provided in parallel with data tracks, i.e., in the longitudinal direction of the tape, such that the timing of the servo position signal obtained by reading the servo pattern varies continuously as the tape head is moved across the width of the tape. To this end, the servo pattern is composed of magnetic transitions recorded in non-parallel directions, like a pattern composed of slash and backslash pairs, or a pattern composed of first and second chevron pairs with the first and second chevrons having different orientations. An exemplary TBS system is disclosed in U.S. Pat. Nos. 5,689,384 and 5,930,065 and U.S. patent application Ser. No. 09/370256 filed on Aug. 9, 1999.

In addition, several types of tape cartridge drives which implement the timing based servo, such as IBM 3570, are commercially available.

At present, a servo circuit for a tape cartridge drive (hereinafter referred to as "tape drive" or "drive") has filter coefficients which are determined based on a certain ideal model by taking mechanical and electrical margins into account. The mechanical margin relates, for example, to the tape feeding system and head system of the drive, tape distortion and servo pattern shifting, and the electrical margin relates, for example, to electrical disturbance, offset and computational error.

However, even if the filter coefficients are determined by taking these margins into account, there are some drive and cartridge combinations which lack servo stability. For example, some drive and cartridge combinations may have an impulse-like spectrum with an abnormal magnitude at a certain frequency. Current servo systems may have a setup which amplifies this frequency component so that the servo can not follow the tape, which eventually results in a failure of tape writing. Although it is desirable to obtain an optimum set of filter coefficients for all drive and cartridge combinations, it is practically impossible to obtain such optimum filter coefficients since the frequency component which causes instability is not fixed and varies depending on the drive and cartridge combination.

SUMMARY OF THE INVENTION

It is, therefore, an object of the present invention to stabilize a servo system by eliminating the cause of instability due to a particular tape drive and cartridge combination.

It is another object of the present invention to provide a method and system for stabilizing a servo system by re-setting filter coefficients each time a tape cartridge is inserted into a tape drive.

According to a first aspect of the present invention; in a tape drive system performing read/write operations for a tape by inserting a tape cartridge into a tape drive, where the tape cartridge has a tape on which servo and data tracks are arranged longitudinally and a predetermined servo pattern is recorded on each of said servo tracks, a method for stabilizing a servo system for the tape drive is provided which comprises the steps of re-setting coefficients of a low-pass filter for servo control of the tape drive, each time the tape cartridge is inserted into the tape drive, in response to the inserted tape cartridge.

More specifically, the method according to the first aspect comprises the steps of reading a servo pattern recorded on the tape in said tape cartridge inserted into the tape drive, performing a frequency analysis of the servo pattern, detecting, from frequency components obtained by the frequency analysis, a singularity that exceeds a predetermined spectrum range, and setting said coefficients of the low-pass filter so as to cancel a power spectrum of the singularity.

According to a second aspect of the invention, a tape drive is provided into which a tape cartridge is inserted, the tape cartridge having a tape on which servo and data tracks are arranged longitudinally and a predetermined servo pattern is recorded on each of the servo tracks, and which comprises a servo control circuit including a low-pass filter for servo signals, and a circuit for re-setting coefficients of the low-pass filter each time a tape cartridge is inserted, in response to the inserted tape cartridge.

Preferably, the circuit for re-setting the coefficients of the low-pass filter comprises a circuit for reading a servo pattern recorded on the tape in the tape cartridge inserted into the tape drive, a circuit for performing a frequency analysis of the servo pattern, a circuit for detecting, from frequency components obtained by the frequency analysis, a singularity that exceeds a predetermined spectrum range, and a circuit for setting the coefficients of the low-pass filter so as to cancel a power spectrum of the singularity.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
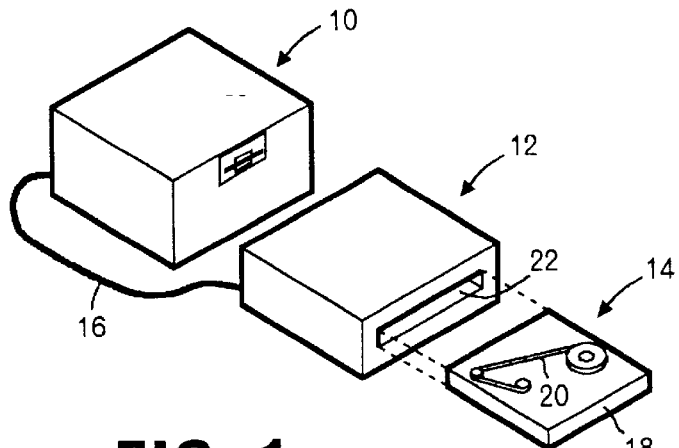
FIG. 1 is a perspective view representation of a tape drive system according to an embodiment of the present invention.

The preferred embodiments of the present invention will now be described with reference to the accompanying drawings. The same reference numerals are used to denote the same components throughout the drawings. The present invention will be explained in accordance with the best mode for achieving the objects of the invention; however, various modifications of this invention can of course be made without departing from the spirit and scope of the invention.

A tape drive system according to the invention is shown in FIG. 1. This system comprises a tape drive 12 connected to a host computer 10 by a cable 16, and an associated tape cartridge 14. The tape drive 12 includes a receiving slot 22 into which the tape cartridge 14 is inserted. The tape cartridge 14 comprises a housing 18 containing a length of magnetic tape 20. Examples of magnetic tape cartridges include a single reel cartridge, such as IBM 3590 or Digital Linear Tape, and a dual reel cartridge, such as Travan or IBM 3570. The tape drive 12 may also be an optical tape drive. In that case, the tape 20 will be an optical medium. The host computer 10 may any suitable computer, for example, a personal computer such as IBM Aptiva, a workstation such as IBM RS/6000, or a systems computer such as IBM AS/400. The tape drive 12 is preferably compatible with the associated host computer, and can assume any one of a variety of cartridge or cassette linear formats. Examples of such tape drives include IBM 3490 tape drive, or Digital Linear Tape or Travan compatible tape drives.

Figure 2:
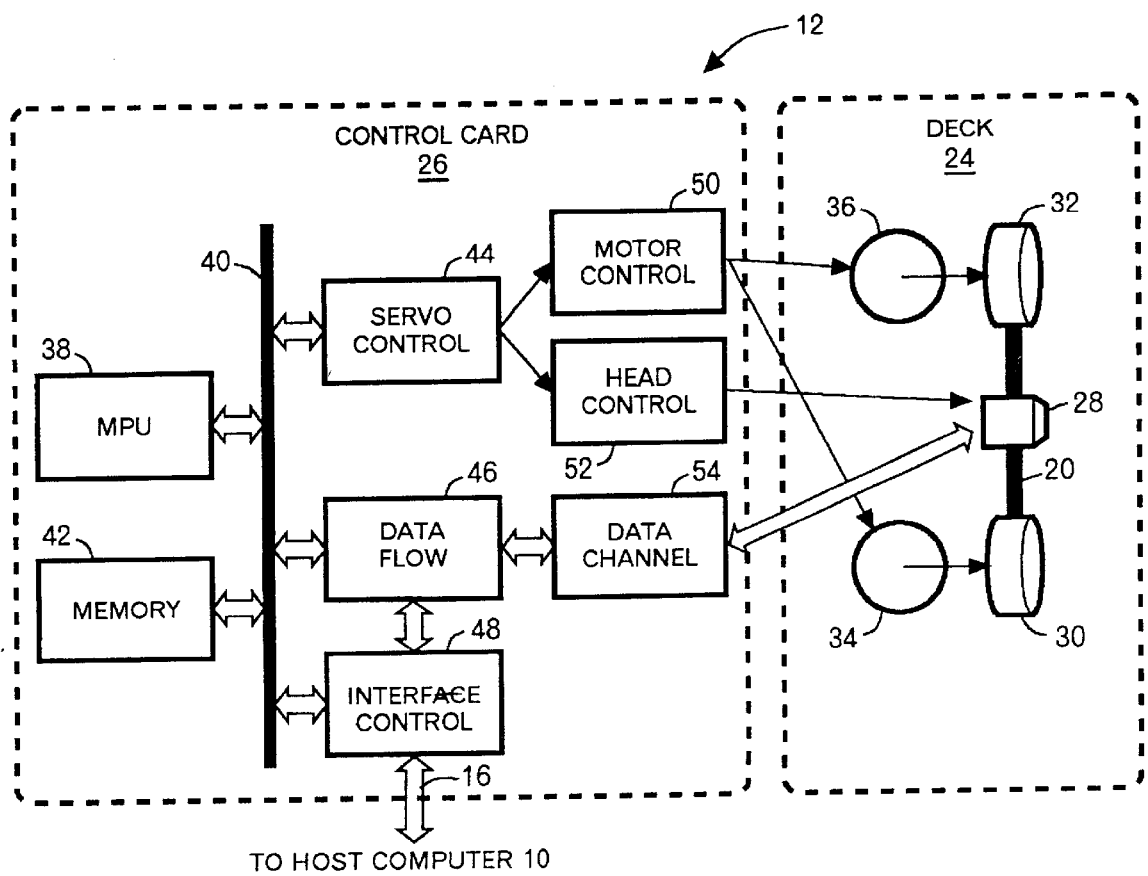
FIG. 2 is a block diagram showing an exemplary arrangement for a control card and a deck of a tape drive according to the present invention.

The typical configuration of the tape drive 12 is shown in FIG. 2. The tape drive 12 in FIG. 2 comprises a deck 24 including movable parts, and a control card 26 including various circuits and buses. The deck 24 includes a head assembly 28 which contacts the tape 20 of the tape cartridge inserted into the tape drive 12 to read and write data and read a servo pattern, and motors 34 and 36 for respectively rotating a supply reel 30 and a take-up reel 32. For a tape cartridge 14 of a dual reel type, both of the reels 30 and 32 are included in the tape cartridge 14. For a tape cartridge 14 of a single reel type, however, only the supply reel 30 is included in the tape cartridge 14 while the take-up reel 32 is provided in the tape drive 12. Although not shown in FIG. 2, the deck 24 additionally includes a mechanism for moving the head assembly 28 across the width of the tape 20, a mechanism for holding the inserted tape cartridge, and a mechanism for ejecting the inserted tape cartridge.

The control card 26 includes a microprocessor (MPU) 38 for the overall control of the tape drive 12; a memory 42, a servo control unit 44, a data flow unit 46 and an interface control unit 48 all of which are connected to the MPU 38 via an internal bus 40; a motor control unit 50 and a head control unit 52 which are connected to the servo control unit 44; and a data channel unit 54 which is connected to the data flow unit 46. While the memory 42 is shown as a single hardware component in FIG. 2, it is actually preferably constituted by a read only memory (ROM) storing a program to be executed by the MPU 38, and a working random access memory (RAM). The servo control unit 44 manages speed control for the motors 34 and 36 and position control for the head assembly 28 by transmitting the respective control signals to the motor control unit 50 and the head control unit 52. The motor and head control units 50 and 52 respond to these control signals by physically driving the motors 34, 36 and the head assembly 28, respectively.

The data flow unit 46 compresses data to be written on the tape 20, decompresses data read from the tape 20 and corrects errors, and is connected not only to the data channel unit 54 but also to the interface control unit 48. The interface control unit 48 is provided to communicate data to/from the host computer 10 via the cable 16, and is assumed to be a SCSI interface in the present embodiment. The data channel unit 54 is essentially a data modulating and demodulating circuit. That is, when data is written to the tape 20, it performs digital-analog conversion and modulation for data received from the data flow unit 46, and when data is read from the tape 20, it performs analog-digital conversion and demodulation for data read by the head assembly 28.

Since the general operations of the components of the tape drive 12 shown in FIG. 2 are well known, no detailed explanation for them will be given, except for the configuration and operation for the servo control which the present invention relates to.

Figure 3:
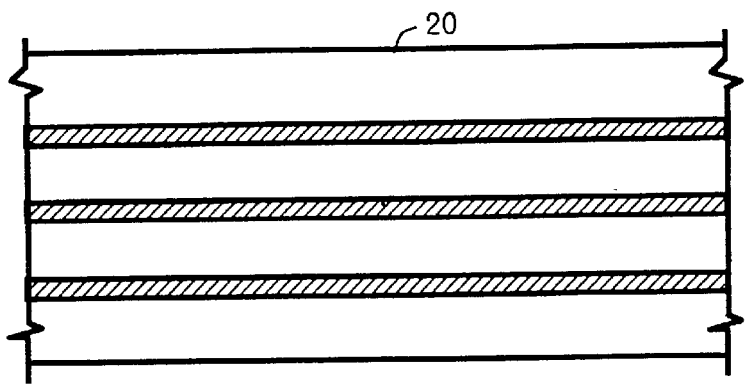
FIG. 3 is a diagram showing multiple data tracks and servo tracks that are arranged alternately and in parallel along the longitudinal direction of a tape.

An exemplary arrangement of data and servo tracks on the tape 20 is shown in FIG. 3 in which blank portions represent data track regions, and shaded portions represent servo track regions. As illustrated, the data and servo tracks are alternately arranged in parallel with each other along the longitudinal direction of the tape 20. Such an arrangement of data and servo tracks is well known and is disclosed, for example, in U.S. Pat. Nos. 5,432,652 and 5,629,813.

Figure 4:
FIG. 4 illustrates exemplary servo patterns recorded on the servo tracks.
Figure 4:
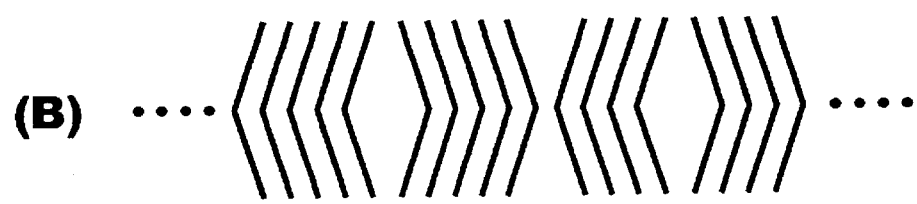

Exemplary servo patterns recorded on the servo tracks are shown in FIG. 4. FIG. 4, (A) illustrates two pattern types of slash and backslash pairs (one pattern type consists of five pairs and the other pattern type consists of four pairs) which appear alternately and repetitively, and (B) illustrates two pattern types of chevron pairs having different orientations (again, one pattern type consists of five pairs and the other pattern type consists of four pairs) which appear alternately and repetitively. These servo patterns are also well known, for example, the pattern of (A) is disclosed in U.S. patent application Ser. No. 09/370256, and the pattern of (B) is disclosed in U.S. Pat. Nos. 5,689,384 and 5,930,065. The timing based servo is based on these servo patterns which consists of magnetic transitions recorded in non-parallel directions, as is apparent from the drawing, and are read by a special servo head (not shown) included in the head assembly 28.

Figure 5:
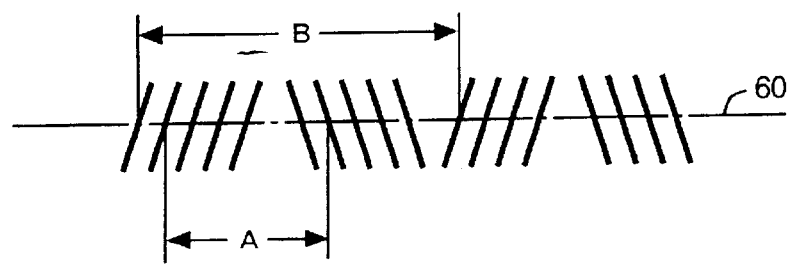
FIG. 5 illustrates a manner for measuring intra- pattern and inter-pattern intervals from a servo pattern read by a servo head.

The process for reading the servo pattern consisting of the slash and backslash pairs shown in FIG. 4(A) will now be described with reference to FIG. 5. It should be noted that a similar process is performed for reading the servo pattern of FIG. 4(B). In FIG. 5, it is assumed that a servo head (not shown) is positioned on a center line of the servo track which is denoted by a chain line 60. As the tape 20 runs, the servo head reads the servo pattern and transmits its read signal to the MPU 38 via the data channel unit 54 and the data flow unit 46. Upon receipt of the servo pattern read signal, the MPU 38 measures an intra-pattern interval A and an inter-pattern interval B shown in FIG. 5 by using two counters (A and B counters) which are operated at a predetermined clock (e.g., 8.25 MHz). The interval A is an interval between non-parallel paired stripes in one repetitive pattern, and as the head moves across the width of the tape 20 (vertical direction in FIG. 5), its value increases or decreases accordingly. The interval B is an interval between two adjacent repetitive patterns, and its value does not change even when the head moves across the width of the tape 20. The timing based servo uses such characteristics of the intervals A and B to position the head.

The MPU 38 uses the count values A and B to calculate a position error signal (PES) according to the following equation.

$$PES = A/\text{Filter}(B) \tag{1}$$

Figure 6:
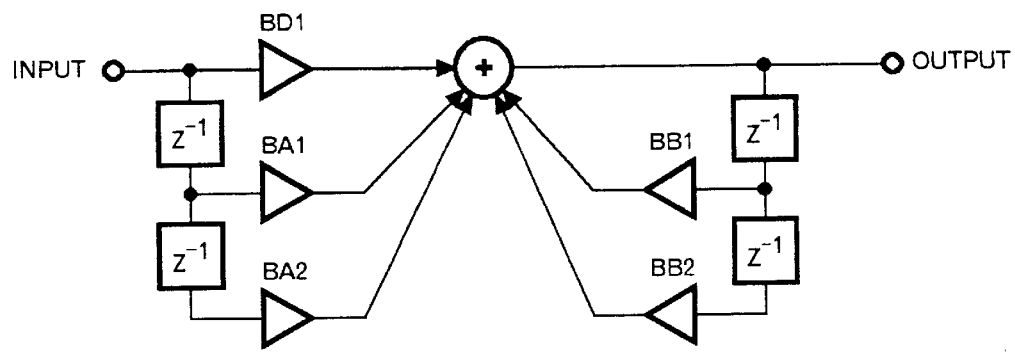
FIG. 6 is a block diagram showing an exemplary arrangement of a low-pass filter used for the calculation of a position error signal (PES).

In the above equation, the denominator "Filter(B)" denotes that a low-pass filter is applied to the B counter in accordance with the present invention. As is well known in the art, a low-pass filter may have a structure such as shown in FIG. 6. In FIG. 6, the low-pass filter includes a unit time delay circuit "$Z^{-1}$", an adder "+", and multipliers "Bi" (i=D1, A1, A2, B1, B2) for multiplying with predetermined filter coefficients Bi. As will be described later, the filter coefficients Bi are set to optimum values through simulation at design time. Although the number of filter coefficients Bi in the example of FIG. 6 is five, it may be varied in accordance with filter design.

Figure 7:
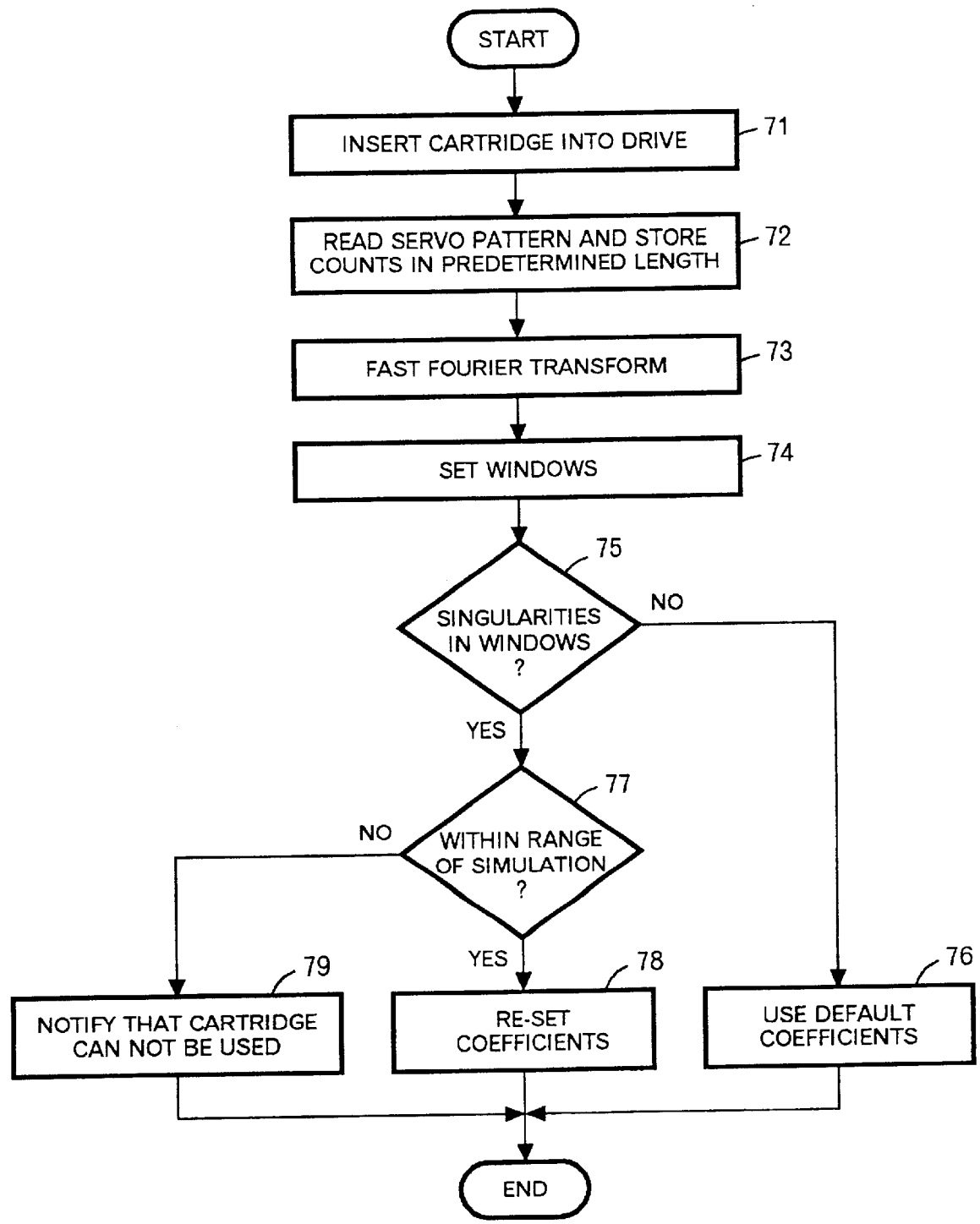
FIG. 7 is a flowchart showing the method for re-setting filter coefficients according to the present invention.

As was previously described, the servo system may not be stabilized depending on the combination of a particular tape cartridge and tape drive. That is, if a singular frequency overlaps in the count value B included in the denominator of the PES calculation equation (1), the frequency component is amplified so that the head positioning is adversely affected. Therefore, the present invention stabilizes the servo system by re-setting the coefficients of the low-pass filter each time a tape cartridge is inserted into the tape drive, in accordance with the process shown in FIG. 7.

The re-setting of the filter coefficients is started when the cartridge 14 is inserted into the tape drive 12 (step 71). At step 72, the servo pattern is read, and the above described A and B counts included in a portion of the pattern having a predetermined length (e.g., 1000 to 2000 count values) are stored in the memory 42. Then, at step 73, a fast Fourier transform (FFT) is performed on the A and B counts to obtain the relationship between the frequency and the power spectrum. Then, at step 74, windows having a predetermined width are set in order to find any singularity in the frequency components. In this embodiment, the following two windows having center frequencies 1.5 KHz and 2.0 KHz, respectively, and extending by ±250 Hz therefrom are set up.

First window: 1.5 KHz±250 Hz
Second window: 2.0 KHz±250 Hz

We have determined 1.5 KHz and 2.0 KHz as the center frequencies of the windows because, during the course of experiments involving various tape drive and tape cartridge combinations, we found that frequencies corresponding to singularities appeared at around 1.5 KHz and 2.0 KHz only.

At step 75, it is determined whether a singularity is present in the windows. The following expression is used to find the singularity.

$$|\text{med}(f) - x(i)| > Th \tag{2}$$

In this expression, med(f) denotes a median for a string of signals in the windows centering around the above two frequencies, x(i) denotes the i-th signal value (spectrum value of frequency) in each window, and (Th) denotes a predetermined threshold value. The spectrum obtained by the FFT has a resolution of $2^8$, ranging from 0 to 255. According to the experiments, if a difference between a specific signal value and a median is greater than $\frac{1}{8}$ of $2^8$, i.e., $2^5$, it can be regarded as a singularity. Thus, in the preferred embodiments, the threshold value (Th) is set to $2^5$. A mere average value is not preferable in the above expression (2) because it becomes large if multiple singularities are present. A median denotes a center value when the spectrum values in the window are arranged in order of magnitude.

If no singularity is found in either window at step 75, the process proceeds to step 76 to use default filter coefficients. In the present embodiment, the default filter coefficient BD1 shown in FIG. 6 is one, and the others (BA1, BA2, BB1 and BB2) are zero. Such a filter is called "identity filter" which outputs its input as it is. On the other hand, if a singularity is found at step 75, the process proceeds to step 77 to determine whether the singularity falls within the range of the simulation. In the present embodiment, predetermined sets (three sets in the following example) of coefficients are prepared in advance through simulation by assuming singularities. Therefore, it must be determined whether a singularity found falls within the range of the assumption.

If the singularity lies within the range, the process proceeds to step 78 to re-set filter coefficients, otherwise to step 79 to notify the user that the inserted tape cartridge can not be used, by means of, for example, a display message or lighting of a warning lamp. At step 78, one of three filters is selected in accordance with the singularity found. These filters are (1) an identity filter, (2) a low-pass filter having a cutoff frequency of 500 Hz, and (3) a low-pass filter having a cutoff frequency of 1 KHz. The low-pass filters (2) and (3) are designed to cancel out the power spectrum at a singularity. These filters can be obtained by properly setting the above described filter coefficients Bi. Of course, as different designs of tape drives and tape cartridges are adopted, the number of filters to be prepared in advance and the cutoff frequencies may be varied accordingly.

If singularities having the same frequency are found in A and B counts, respectively, the identity filter (1) is selected because, as is apparent from the PES calculation equation, the singularities are normalized and no particular problem arises. The identity filter is synonymous with no filter. A problem would arise, however, if a frequency component overlaps in the B count. Therefore, if a singularity is found in the B count in the first window, the low-pass filter (2) is selected to remove its adverse effects. Also, if a singularity is found in the B count in the second window, the low-pass filter (3) is selected.

Figure 8:
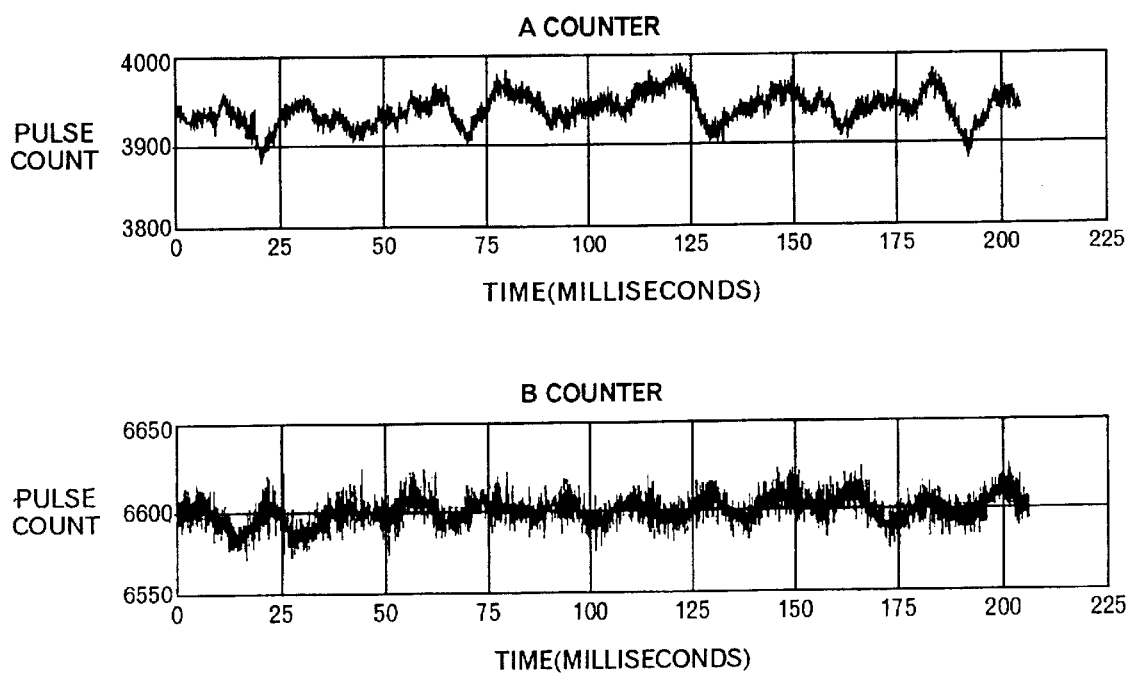
FIG. 8 illustrates exemplary waveforms obtained by measuring the intra-pattern and inter-pattern intervals.
Figure 9:
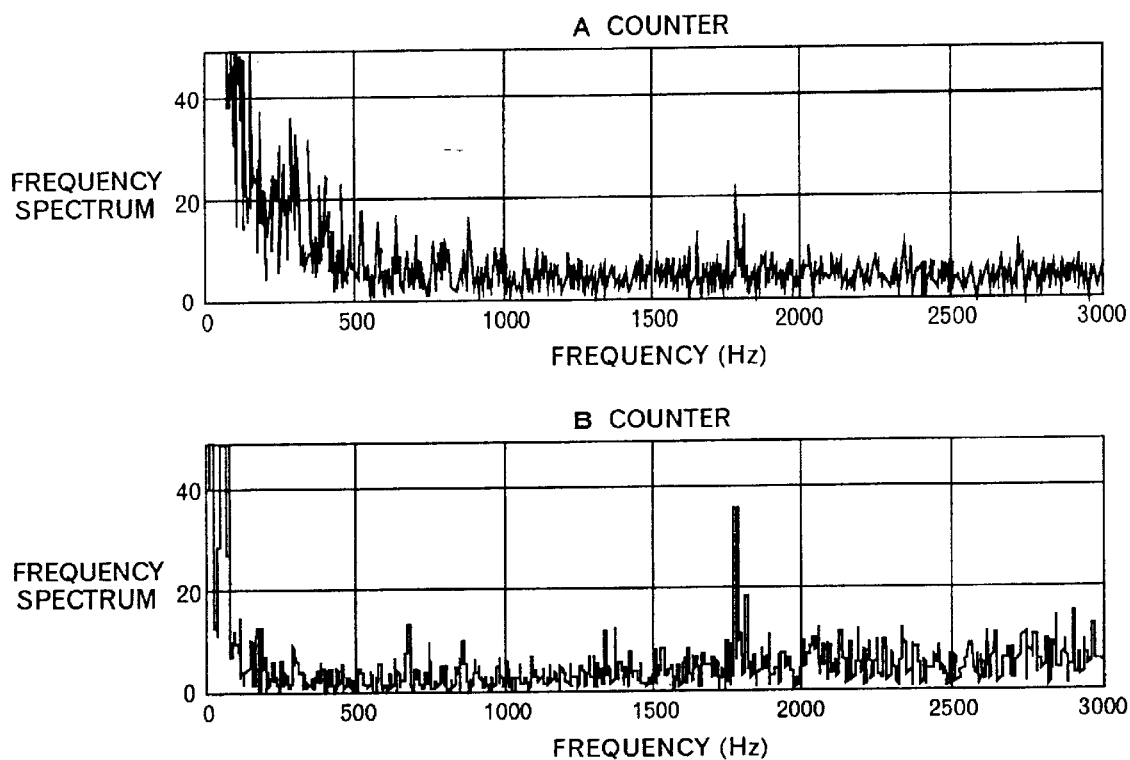
FIG. 9 illustrates exemplary waveforms showing frequency distributions obtained by performing fast Fourier transform for the counts in FIG. 8.
Figure 10:
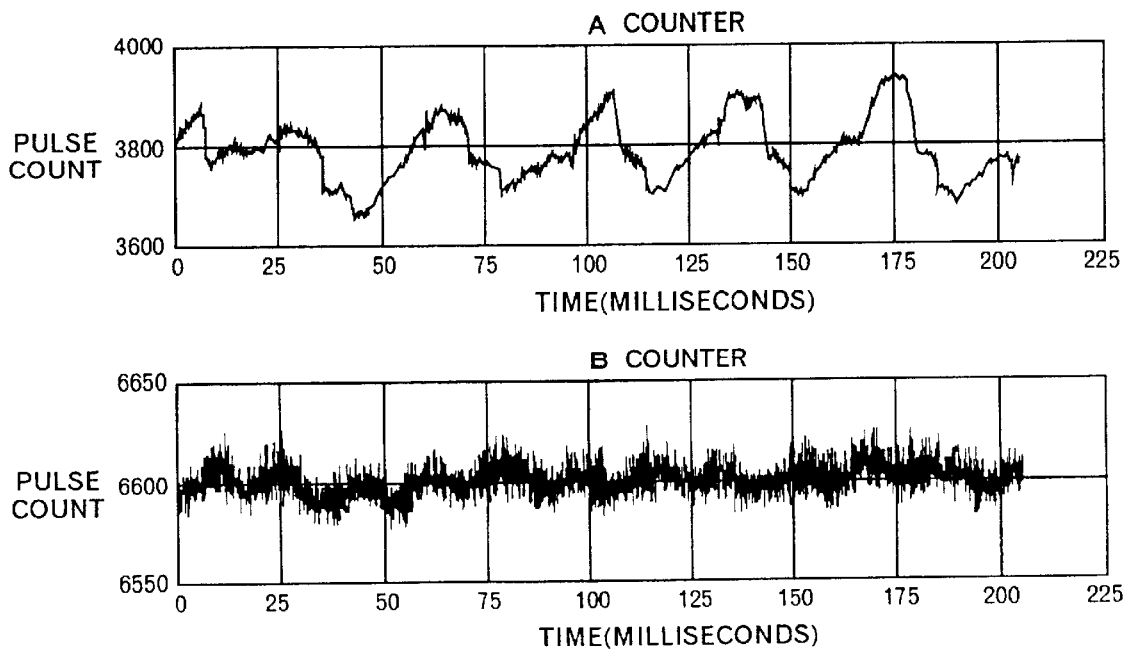
FIG. 10 illustrates other exemplary waveforms obtained by measuring the intra-pattern and inter-pattern intervals.
Figure 11:
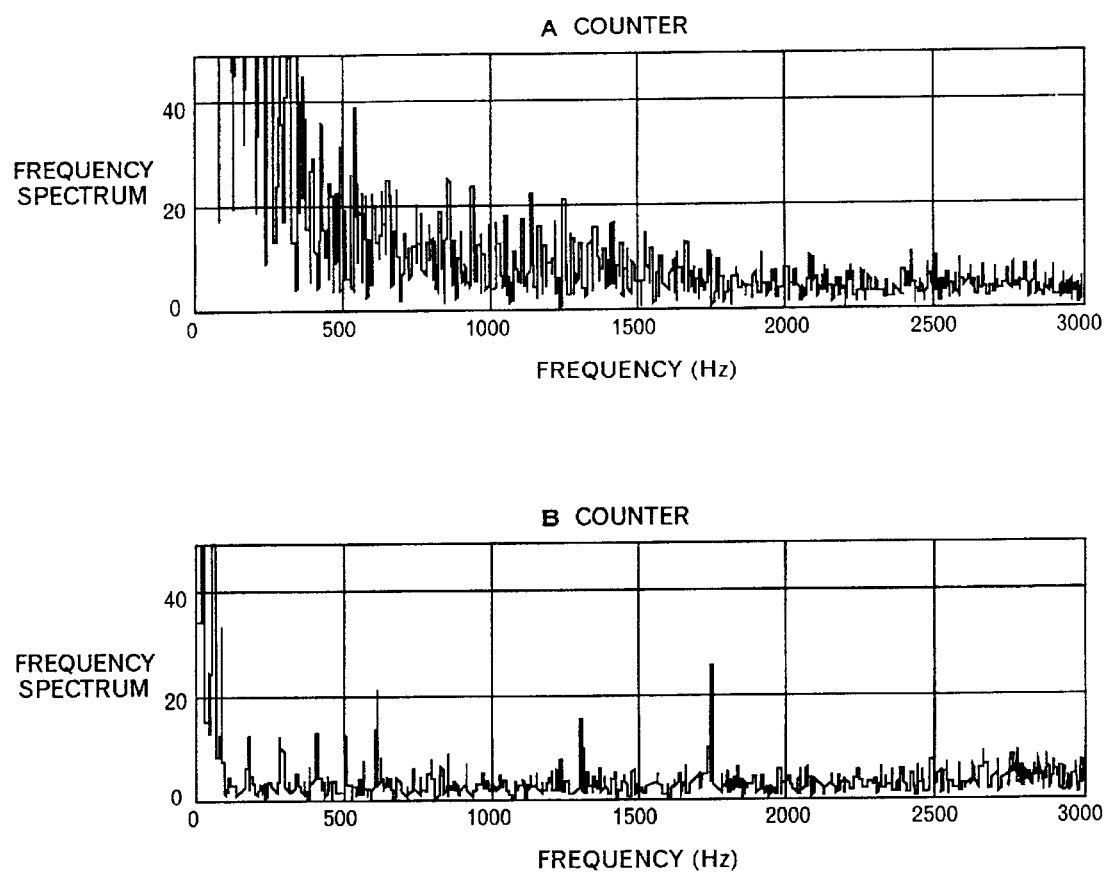
FIG. 11 illustrates exemplary waveforms showing frequency distributions obtained by performing fast Fourier transform for the counts in FIG. 10.

Now illustrating with actual waveforms, FIG. 8 illustrates the waveforms of the A and B counts obtained at step 72, and FIG. 9 illustrates the waveforms obtained by the fast Fourier transform at step 73. The vertical axes in FIG. 8 represent the pulse count values of the A and B counters, and the horizontal axes represent time (milliseconds). The vertical axes in FIG. 9 represent the frequency spectrum (intensity of each frequency for the pulse counts) after the fast Fourier transform, and the horizontal axes represent frequencies (Hz). The graphs in FIG. 9 indicate that each of the A and B counts has a singularity S near 1.8 KHz. Therefore, the identity filter (1) is selected in this case. Other waveforms for the A and B counts are shown in FIG. 10, and waveforms after the fast Fourier transform are shown in FIG. 11. In FIG. 11, the A count does not satisfy the condition of the expression (2) (no singularity), and only the B count has a singularity S near 1.8 KHz. Therefore, the low-pass filter (3) is selected.

Examining FIGS. 9 and 11 closely, it can be seen that there is a region in which a projected portion (singularity S) is found in a relatively flat waveform, and another region in which multiple such projected portions or impulse-like signals are present. Generally, an impulse-like singularity may be detected in a flat portion by calculating a difference between the average value and each signal value in a range (window) of a signal string, and determining a signal value having a large difference as a singularity. However, if a singularity is very large, or if multiple impulse-like signals are present in one window, it would be difficult to detect a correct singularity merely by using the average value. Therefore, in the preferred embodiments of the present invention, a median is used instead of the average value as described above. A rank order value may be used instead of a median. A median is classified as a special rank order value. When a rank order value is used, the above expression (2) becomes $$|\text{rank}(f,r)-x(i)|>Th \quad (3)$$

wherein rank(f,r) represents a rank order filter, f is a signal string within some range, and r is a position where a rank value is obtained. A rank order filter is described, for example, in Ryo Taguchi, "Nonlinear Digital Filter—Median Filter and Load Median Filter", System Control Information Institute, System/Control/Information, Vol. 40, No. 9, pp. 410–418, 1996.

In the embodiments described above, several sets (three sets in the above embodiments) of filter coefficients are prepared in advance and one of them is selected, rather than recalculating the filter coefficients based on the analysis of the servo signals each time a tape cartridge is inserted. Taking storage capacity and performance of a microprocessor provided in a tape drive into consideration, the method of the above embodiments is more practical. If the filter coefficients are to be recalculated each time a tape cartridge is inserted, a considerable period of calculation time and larger storage capacity are required, and it is very difficult to determine whether the calculated coefficients provide a stable servo system. Whereas, according to the method of the above embodiments in which the filter coefficients are prepared in advance, stabilization can be confirmed in advance by simulation.

While the preferred embodiments of the invention have been described in detail, the present invention is not limited thereto, and various modifications and changes are possible. For example, the servo pattern may be a non-parallel pattern other than the slash and backslash pair pattern and the chevron pattern. Further, if a higher performance microprocessor is available to facilitate coefficient calculations in real time, the coefficients may be recalculated each time a tape cartridge is inserted, instead of preparing the filter coefficients in advance.

What is claimed is:

1. In a tape drive system performing read/write operations for a tape by inserting a tape cartridge into a tape drive, said tape cartridge having a tape on which servo and data tracks are arranged longitudinally and a predetermined servo pattern is recorded on each of said servo tracks, a method for stabilizing a servo system for said tape drive comprising the step of:
    re-setting coefficients of a low-pass filter for servo control of said tape drive, each time said tape cartridge is inserted into said tape drive, in response to the characteristics of the inserted tape cartridge.

2. The method according to claim 1, further comprising the steps of:
    reading a servo pattern recorded on the tape in said tape cartridge inserted into said tape drive;
    performing a frequency analysis of said read servo pattern;
    detecting, from frequency components obtained by said frequency analysis, a singularity that exceeds a predetermined spectrum range; and
    setting said coefficients of said low-pass filter so as to cancel a power spectrum of said singularity.

3. The method according to claim 2, wherein said servo pattern consists of a pattern of repetitive magnetic transitions recorded in non-parallel directions, and said step for performing a frequency analysis of said servo pattern includes the steps of measuring intra-pattern and inter-pattern intervals in said repetitive pattern and performing a fast Fourier transform on the measured results.

4. The method according to claim 3, wherein said step for detecting a singularity includes the steps of setting multiple windows each having a predetermined frequency at its center, for data obtained by said fast Fourier transform, and detecting a singularity in each of said windows.

5. The method according to claim 4, wherein said step for detecting a singularity compares a median for all signal values in each of said windows with each of said signal values, and defines as said singularity a frequency of a signal value having a difference from said median which exceeds a predetermined threshold value.

6. The method according to one of claims 2 to 5, wherein said step for setting coefficients of a low-pass filter includes the steps of preparing multiple sets of filter coefficients in advance by simulation, and selecting a set of filter coefficients in accordance with said detected singularity.

7. A tape drive into which a tape cartridge is inserted, said tape cartridge having a tape on which servo and data tracks are arranged longitudinally and a predetermined servo pattern is recorded on each of said servo tracks, comprising:
    servo control means including a low-pass filter for servo signals; and
    means for re-setting coefficients of said low-pass filter each time a tape cartridge is inserted, in response to the characteristics of the inserted tape cartridge.

8. The tape drive according to claim 7, wherein said re-setting means comprises:
    means for reading a servo pattern recorded on the tape in said tape cartridge inserted into said tape drive;
    means for performing a frequency analysis of said servo pattern;
    means for detecting, from frequency components obtained by said frequency analysis, a singularity that exceeds a predetermined spectrum range; and
    means for setting said coefficients of said low-pass filter so as to cancel a power spectrum of said singularity.

9. The tape drive according to claim 8, wherein said servo pattern consists of a pattern of repetitive magnetic transitions recorded in non-parallel directions, and said means for performing a frequency analysis of said servo pattern includes means for measuring intra-pattern and inter-pattern intervals in said repetitive pattern and performing a fast Fourier transform on the measured results.

10. The tape drive according to claim 9, wherein said means for detecting a singularity includes means for setting multiple windows each having a predetermined frequency at its center, for data obtained by said fast Fourier transform, and detecting a singularity in each of said windows.

11. The tape drive according to claim 10, wherein said means for detecting a singularity compares a median for all signal values in each of said windows with each of said signal values, and defines as said singularity a frequency of a signal value having a difference from said median which exceeds a predetermined threshold value.

12. The tape drive according to one of claims 8 to 11, wherein said means for setting coefficients of said low-pass filter includes means for preparing multiple sets of filter coefficients in advance by simulation, and selecting a set of filter coefficients in accordance with said detected singularity.

* * * * *